(12) United States Patent
Konukoglu et al.

(10) Patent No.: US 9,710,730 B2
(45) Date of Patent: Jul. 18, 2017

(54) IMAGE REGISTRATION

(75) Inventors: Ender Konukoglu, Cambridge (GB); Sayan Pathak, Kirkland, WA (US); Khan Mohammad Siddiqui, Kirkland, WA (US); Antonio Criminisi, Cambridge (GB); Steven White, Seattle, WA (US); Jamie Daniel Joseph Shotton, Cambridge (GB); Duncan Paul Robertson, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/025,500

(22) Filed: Feb. 11, 2011

(65) Prior Publication Data

US 2012/0207359 A1    Aug. 16, 2012

(51) Int. Cl.
*G06K 9/32* (2006.01)
*G06K 9/62* (2006.01)
*G06T 7/35* (2017.01)

(52) U.S. Cl.
CPC ......... *G06K 9/6277* (2013.01); *G06K 9/6282* (2013.01); *G06T 7/35* (2017.01); *G06T 2207/10072* (2013.01); *G06T 2207/10116* (2013.01); *G06T 2207/10132* (2013.01); *G06T 2207/20072* (2013.01); *G06T 2207/20076* (2013.01); *G06T 2207/20081* (2013.01); *G06T 2207/30004* (2013.01)

(58) Field of Classification Search
USPC .......................................... 382/128–131, 294
See application file for complete search history.

(56) References Cited

U.S. PATENT DOCUMENTS 5,638,501 A  *  6/1997  Gough et al. ................. 345/639
6,292,683 B1     9/2001  Gupta et al.
(Continued)

FOREIGN PATENT DOCUMENTS

CN    1818974 A    8/2006
CN    1920882 A    2/2007

OTHER PUBLICATIONS

Regression forests—CT studies, Crimsini et al., M ICCAI-MCV, Sep. 2010, pp. 106-117, See I DS filed on May 4, 2011.*

(Continued)

*Primary Examiner* — Jayesh A Patel

(57) ABSTRACT

Image registration is described. In an embodiment an image registration system executes automatic registration of images, for example medical images. In an example, semantic information is computed for each of the images to be registered comprising information about the types of objects in the images and the certainty of that information. In an example a mapping is found to register the images which takes into account the intensities of the image elements as well as the semantic information in a manner which is weighted by the certainty of that semantic information. For example, the semantic information is computed by estimating posterior distributions for the locations of anatomical structures by using a regression forest and transforming the posterior distributions into a probability map. In an example the mapping is found as a global point of inflection of an energy function, the energy function having a term related to the semantic information.

20 Claims, 12 Drawing Sheets

(56) References Cited

U.S. PATENT DOCUMENTS

| | | | | |
|---|---|---|---|---|
| 6,654,060 | B1* | 11/2003 | Kurosawa et al. | 348/333.02 |
| 6,775,405 | B1* | 8/2004 | Zhu | G06K 9/6212 345/419 |
| 7,639,896 | B2* | 12/2009 | Sun et al. | 382/294 |
| 7,876,939 | B2* | 1/2011 | Yankelevitz | A61B 5/1075 382/128 |
| 8,217,357 | B2* | 7/2012 | Stein et al. | 250/366 |
| 2004/0071325 | A1 | 4/2004 | Declerck et al. | |
| 2006/0002631 | A1 | 1/2006 | Fu et al. | |
| 2006/0228026 | A1* | 10/2006 | Xiong | G06K 9/00275 382/181 |
| 2006/0290695 | A1* | 12/2006 | Salomie | G06T 17/20 345/420 |
| 2007/0237370 | A1 | 10/2007 | Zhou et al. | |
| 2008/0019581 | A1* | 1/2008 | Gkanatsios et al. | 382/131 |
| 2008/0068401 | A1* | 3/2008 | Albrecht et al. | 345/645 |
| 2008/0100612 | A1* | 5/2008 | Dastmalchi et al. | 345/418 |
| 2008/0267483 | A1 | 10/2008 | Zhan et al. | |
| 2009/0028403 | A1 | 1/2009 | Bar-Aviv et al. | |
| 2010/0067768 | A1 | 3/2010 | Ionasec et al. | |
| 2010/0119135 | A1 | 5/2010 | Coupe et al. | |
| 2010/0254573 | A1* | 10/2010 | Barlaud | G06F 17/30814 382/107 |

OTHER PUBLICATIONS

"International Search Report", Mailed Date: Sep. 21, 2012, Application No. PCT/US2012/024775, Filed Date: Feb. 11, 2012, pp. 11.
Becker, et al., "Learning to Make Coherent Predictions in Domains with Discontinuities", retrieved on Nov. 8, 2010 at <<http://books.nips.cc/papers/txt/nips04/0372.txt>>, Proceedings of Conference on Advances in Neural Information Processing Systems (NIPS), Denver, Colorado, Dec. 1991, pp. 1-5.
Bell, et al., "An information-maximisation approach to blind separation and blind deconvolution", retrieved on Nov. 8, 2010 at <<http://citeseerx.ist.psu.edu/viewdoc/download?doi=10.1.1.110.696&rep=rep1&type=pdf>>, MIT Press, Journal of Neural Computation, vol. 7, No. 6, Nov. 1995, pp. 1129-1159.
"Brain Web: Simulated Brain Database", retrieved on Nov. 8, 2010 at <<http://www.bic.mni.mcgill.ca/brainweb/>>, 2006, pp. 1-2.
Bridle, "Training Stochastic Model Recognition Algorithms as Networks can lead to Maximum Mutual Information Estimation of Parameters", retrieved on Nov. 8, 2010 at <<http://books.nips.cc/papers/files/nips02/0211.pdf>>, Morgan Kaufmann Publishers, Advances in Neural Information Processing Systems, vol. 2, 1990, pp. 211-217.
Burt, et al., "The Laplacian Pyramid as a Compact Image Code", retrieved on Nov. 8, 2010 at <<http://citeseerx.ist.psu.edu/viewdoc/download?doi=10.1.1.54.299&rep=rep1&type=pdf>>, IEEE Transactions on Communications, vol. COM-31, No. 4, Apr. 1983, pp. 532-540.
Chan, et al., "Multi-modal image registration by minimizing Kullback-Leibler distance between expected and observed joint class histograms", retrieved on Nov. 8, 2010 at <<http://www.cs.ust.hk/~achung/cvpr03_chan.pdf>>, IEEE Computer Society, Conference on Computer Vision and Pattern Recognition (CVPR), 2003, pp. 1-7.
Commowick, et al., "An Efficient Locally Affine Framework for the Registration of Anatomical Structures", retrieved on Nov. 8, 2010 at <<http://citeseerx.ist.psu.edu/viewdoc/download;jsessionid=A2E6CB6CAF2E6417C915D2D36AF75440?doi=10.1.1.125.4836&rep=rep1&type=pdf>>, IEEE International Symposium on Biomedical Imaging (ISBI), Arlington, Virginia, Apr. 2006, pp. 478-481.
Commowick, "An Efficient Locally Affine Framework for the Smooth Registration of Anatomical Structures", Elsevier Press, Medical Image Analysis, vol. 12, No. 4, 2008, pp. 427-441.
Cover, et al., "Elements of Information Theory, Second Edition", retrieved on Nov. 8, 2010 at <<http://onlinelibrary.wiley.com/doi/10.1002/047174882X.fmatter/pdf>>, Wiley-Interscience Publishers, 2006, 748 pages.
Criminisi, et al., "Decision Forests with Long-Range Spatial Context for Organ Localization in CT Volumes", retrieved on Nov. 8, 2010 at <<http://research.microsoft.com/pubs/81675/Criminisi_MICCAI_PMMIA_2009_.pdf>>, Workshop on Probabilistic Models for Medical Image Analysis (MICCAI-PMMIA), 2009, pp. 1-12.
Criminisi, et al., "Regression Forests for Efficient Anatomy Detection and Localization in CT Studies", retrieved on Nov. 8, 2010 at <<http://research.microsoft.com/pubs/135411/Criminisi_MICCAI_MCV2010.pdf>>, Springer Verlag, Medical Computer Vision Workshop: Recognition Techniques and Applications in Medical Imaging (MICCAI-MCV), Sep. 2010, pp. 106-117.
D'Agostino, et al., "A viscous fluid model for multimodal non-rigid image registration using mutual information", retrieved on Nov. 8, 2010 at <<http://www-cs.engr.ccny.cuny.edu/~zhu/GC-Spring2006/Readings/viscous-multimodal.pdf>>, Elsevier Press, Medical Image Analysis, vol. 7, 2003, pp. 565-575.
D'Agostino, et al., "An information theoretic approach for non-rigid image registration using voxel class probabilities", Elsevier Press, Medical Image Analysis, vol. 10, 2006, pp. 413-431.
Duda, et al., "Pattern Classification and Scene Analysis", retrieved on Nov. 8, 2010 at <<http://ieeexplore.ieee.org/stamp/stamp.jsp?tp=&arnumber=1100577>>, Wiley-Interscience Publishers, 1973, pp. 482 pages.
Feldmar, et al., "3D-2D projective registration of free-form curves and surfaces", retrieved on Nov. 8, 2010 at <<http://hal.inria.fr/docs/00/07/42/41/PDF/RR-2434.pdf>>, Inria, Dec. 1994, pp. 1-47.
Fisher, et al., "Skeletonization/Medial Axis Transform", retrieved on Nov. 8, 2010 at <<http://www.dai.ed.ac.uk/HIPR2/skeleton.htm>>, HIPR, 2003, pp. 1-7.
Grimson, et al., "An Automatic Registration Method for Frameless Stereotaxy, Image Guided Surgery, and Enhanced Reality Visualization", retrieved on Nov. 8, 2010 at <<http://ieeexplore.ieee.org/stamp/stamp.jsp?tp=&arnumber=323862>>, IEEE Computer Society, Proceedings of Conference on Computer Vision and Pattern Recognition (CVPR), Seattle, Washington, Jun. 1994, pp. 430-436.
Hermosillo, et al., "A Variational Approach to Multi-Modal Image Matching", retrieved on Nov. 8, 2010 at <<http://citeseerx.ist.psu.edu/viewdoc/download;jsessionid=D68B3EE8196AE123AF95DD050FE70879?doi=10.1.1.10.8636&rep=rep1&type=pdf>>, INRI, Feb. 2001, pp. 1-37.
Hill, et al., "Voxel Similarity Measures for Automated Image Registration", retrieved on Nov. 8, 2010 at <<http://eecs.vanderbilt.edu/courses/cs359/other_links/papers/1993_Hill_VBC_histogram_RIU_3rd_moments.pdf>>, Intl Society for Optics and Photonics (SPIE), Proceedings of Visualization in Biomedical Computing, vol. 2359, Sep. 1994, pp. 205-216.
Klein, et al., "elastix: A Toolbox for Intensity-Based Medical Image Registration", retrieved on Nov. 8, 2010 at <<http://www.bigr.nl/files/publications/484_ElastixArticleIEEETMIpublished.pdf>>, IEEE Transactions on Medical Imaging, vol. 29, No. 1, Jan. 2010, pp. 196-205.
Kullback, "Information Theory and Statistics", retrieved on Nov. 8, 2010 at <<http://ieeexplore.ieee.org/stamp/stamp.jsp?arnumber=01057581>>, John Wiley and Sons Publishers, 1959, 395 pages.
Lee, et al., "Learning Similarity Measure for Multi-Modal 3D Image Registration", retrieved on Nov. 8, 2010 at <<http://ieeexplore.ieee.org/stamp/stamp.jsp?arnumber=05206840>>, IEEE Conference on Computer Vision and Pattern Recognition (CVPR), Miami, Florida, 2009, pp. 186-193.
Leventon, et al., "Multi-Modal Volume Registration Using Joint Intensity Distributions", retrieved on Nov. 8, 2010 at <<http://citeseerx.ist.psu.edu/viewdoc/download?doi=10.1.1.30.4083&rep=rep1&type=pdf>>, Springer-Verlag London, Proceedings of Conference on Medical Image Computing and Computer-Assisted Intervention (MICCAI), 1998, pp. 1-10.
Linsker, "From basic network principles to neural architecture: Emergence of spatial-opponent cells", retrieved on Nov. 8, 2010 at <<http://www.ncbi.nlm.nih.gov/PMC/articles/PMC386748/pdf/pnas00323-0388.pdf>>, Proceedings of National Academy of Science: Neurobiology, vol. 83, Oct. 1986, pp. 7508-7512.

(56) References Cited

OTHER PUBLICATIONS

Liu, et al., "3D/2D Registration Via Skeletal Near Projective Invariance in Tubular Objects", retrieved on Nov. 8, 2010 at <<http://midag.cs.unc.edu/pubs/papers/MICCAI98-Liu.pdf>>, Springer, LNCS 1496, Proceedings of Medical Image Computing and Computer-Assisted Intervention Workshop (MICCAI), 1998, pp. 780-787.

Ljung, et al., "Theory and Practice of Recursive Identification", retrieved on Nov. 8, 2010 at <<http://ieeexplore.ieee.org/stamp/stamp.jsp?tp=&arnumber=1103802>>, MIT Press, 1983, 552 pages.

Maes, et al., "Comparative Evaluation of Multiresolution Optimization Strategies for Multimodality Image Registration by Maximization of Mutual Information", retrieved on Nov. 8, 2010 at <<http://www.creatis.insalyon.fr/~dsarrut/master/articles/Maes_ComparatEvalOfMultiresOptimStrat_MEDIA_1999.pdf>>, Oxford University Press, Medical Image Analysis, vol. 3, No. 4, 1999, pp. 373-386.

Maes, et al., "Multimodality Image Registration by Maximization of Mutual Information", retrieved on Nov. 8, 2010 at <<http://citeseerx.ist.psu.edu/viewdoc/download?doi=10.1.1.85.1157&rep=rep1&type=pdf>>, IEEE Transactions on Medical Imaging, vol. 16, No. 2, Apr. 1997, pp. 187-198.

Maintz, et al., "A survey of medical image registration", retrieved on Nov. 8, 2010 at <<http://www.sciencedirect.com/science?_ob=MImg&_imagekey=B6W6Y-4902924-1-1&_cdi=6611&_user=10&_pii=S1361841501800268&_origin=search&_coverDate=03%2F31%2F1998&_sk=999979998&view=c&wchp=dGLbVlW->>, Elsevier, Medical Image Analysis, vol. 2, No. 1, Mar. 1998, pp. 1-36.

Malandain, et al., "Physically Based Rigid Registration of 3-D Free-Form Objects: Application to Medical Imaging", retrieved on Nov. 8, 2010 at <<http://citeseerx.ist.psu.edu/viewdoc/download?doi=10.1.1.35.6189&rep=rep1&type=pdf>>, INRI, Jan. 1995, 60 pages.

"MedINRIA", retrieved on Nov. 8, 2010 at <<http://www-sop.inria.fr/asclepios/software/MedINRIA/>>, Asclepios Research Project, INRIA, 2010, pp. 1-3.

Pluim, et al., "Interpolation Artefacts in Mutual Information-Based Image Registration", retrieved on Nov. 8, 2010 at <<http://www.creatis.insalyon.fr/~dsarrut/master/articles/Pluim_InterpArtifMutualInformBasRegi_CVIU_2000.pdf>>, Academic Press, Computer Vision and Image Understanding, vol. 77, 2000, pp. 211-232.

Powell, "The BOBYQA algorithm for bound constrained optimization without derivatives", retrieved on Nov. 8, 2010 at <<http://www.damtp.cam.ac.uk/user/na/NA_papers/NA2009_06.pdf>>, University of Cambridge, Department of Applied Mathematics and Theoretical Physics, Technical Report NA2009 06, Aug. 2009, pp. 1-39.

Press, et al., "Numerical Recipes in C: The Art of Scientific Computing, Second Edition", retrieved on Nov. 8, 2010 at <<http://astronu.jinr.ru/wiki/upload/d/d6/NumericalRecipesinC.pdf>>, Cambridge University Press, 1992, 1018 pages.

Roche, et al., "Multimodal Image Registration by Maximization of the Correlation Ratio", retrieved on Nov. 8, 2010 at <<http://hal.inria.fr/docs/00/07/33/11/PDF/RR-3378.pdf>>, INRIA, Aug. 1998, pp. 1-45.

Rohlfing, et al., "Bee Brains, B-Splines and Computational Democracy: Generating an Average Shape Atlas", retrieved on Nov. 8, 2010 at <<http://www.stanford.edu/~rohlfing/publications/2001-rohlfing-mmbia bee _brain _average_ atlas.pdf>>, IEEE Workshop on Mathematical Methods in Biomedical Image Analysis (MMBIA), Dec. 2001, pp. 187-194.

Rueckert, et al., "Nonrigid Registration Using Free-Form Deformations: Application to Breast MR Images", retrieved on Nov. 8, 2010 at <<http://citeseerx.ist.psu.edu/viewdoc/download?doi=10.1.1.126.4732&rep=rep1&type=pdf>>, IEEE Transactions on Medical Imaging, vol. 18, No. 8, Aug. 1999, pp. 712-721.

Schenck, et al., "Superconducting Open-Configuration MR Imaging System for Image-Guided Therapy", retrieved on Nov. 8, 2010 at <<https://www.spl.harvard.edu/archive/spl-pre2007/pages/papers/schenck/schenck_mrt_ir1995-mj.pdf>>, RSNA, Radiology, vol. 195, No. 3, Jun. 1995, pp. 805-814.

Van Leernput, et al., "Automated Model-Based Tissue Classification of MR Images of the Brain", retrieved on Nov. 8, 2010 at <<http://people.csail.mit.edu/koen/VanLeemputTMI1999b.pdf>>, IEEE Transactions on Medical Imaging, vol. 18, No. 10, Oct. 1999, pp. 897-908.

Viola, et al., "Alignment by Maximization of Mutual Information", retrieved on Nov. 8, 2010 at <<http://people.csail.mit.edu/sw/papers/IJCV-97.pdf>>, International Journal of Computer Vision, vol. 24, No. 2, 1997, pp. 137-154.

Wein, et al., "Automatic CT—ultrasound registration for diagnostic imaging and image-guided intervention", retrieved on Nov. 8, 2010 at <<http://campar.in.tum.de/pub/wein2008ctusfusion/wein2008ctusfusion.pdf>>, Elsevier Press, Medical Image Analysis, vol. 12, 2008, pp. 577-585.

"First Office Action and Search Report Issued in Chinese Patent Application No. 201210030367.9", Mailed Date: Jan. 17, 2014, 17 Pages.

"Second Office Action Issued in Chinese Patent Application No. 201210030367.9", Mailed Date: Sep. 29, 2014, 9 Pages.

"Third Office Action Issued in Chinese Patent Application No. 201210030367.9", Mailed Date: Apr. 3, 2015, 6 Pages.

Wells, et al., "Multi-Modal Volume Registration by Maximization of Mutual Information", retrieved on Nov. 8, 2010 at <<http://citeseerx.ist.psu.edu/viewdoc/download;jsessionid=C3AC66D158707F9B89AFB390B981FB87?doi=10.1.1.29.8917&rep=rep1&type=pdf>>, John Wiley and Son Publilshers, Proceedings of Intl Symposium on Medical Robotics and Computer Assisted Surgery, Baltimore, Maryland, 1995, pp. 55-62.

Wells, Viola, Atsumi, Nakajima, Kikinis, "Multi-Modal Volume Registration by Maximization of Mutual Information", retrieved on Nov. 8, 2010 at <<http://people.csail.mit.edu/sw/papers/mia.pdf>>, Elsevier Publishers, Medical Image Analysis, vol. 1, No. 1, 1996, pp. 35-52.

Widrow, et al., "Adaptive Switching Circuits", retrieved on Nov. 8, 2010 at <<http://isl-www.stanford.edu/—widrow/papers/c1960adaptiveswitching.pdf>>, Institute of Radio Engineers, Western Electronic Show and Convention Record, Part 4, Aug. 1960, pp. 96-104.

Wyatt, et al., "MAP MRF joint segmentation and registration of medical images", Elsevier, 2003, pp. 539-552.

\* cited by examiner

IMAGE REGISTRATION

BACKGROUND

Image registration is used in many application domains such as medical applications, computer aided manufacturing, robotics and others. For example, two or more images of the same scene may have been captured at different times and/or from different view points and/or using different image capture equipment. It may be required to put those images into registration in order to detect differences between the images which are not the result of pose variations of objects in the scene and/or of different view points of an image capture device used to capture the images.

Image registration in the field of medical applications is particularly useful. For example, in clinical scenarios such as patient follow-up and surgery or therapy planning. To enable a medical professional to compare medical images in an accurate manner the images need to be registered in order to remove pose variations of the patient. For example, the registration may result in alignment of corresponding anatomical structures in two medical images.

There is an ongoing need to improve the accuracy and robustness of image registration systems as well as to reduce the time taken for image registration and the computational resources required.

The embodiments described below are not limited to implementations which solve any or all of the disadvantages of known image registration systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Image registration is described. In an embodiment an image registration system executes automatic registration of images, for example medical images. In an example, semantic information is computed for each of the images to be registered comprising information about the types of objects in the images and the certainty of that information. In an example a mapping is found to register the images which takes into account the intensities of the image elements as well as the semantic information in a manner which is weighted by the certainty of that semantic information. For example, the semantic information is computed by estimating posterior distributions for the locations of anatomical structures by using a regression forest and transforming the posterior distributions into a probability map. In an example the mapping is found as a global point of inflection of an energy function, the energy function having a term related to the semantic information.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a medical image registration system, the system described is provided as an example and not a limitation. As those skilled in the art will appreciate, the present examples are suitable for application in a variety of different types of image registration systems.

The techniques below are described with reference to medical images, which can be two or three dimensional images representing an internal structure of a (human or animal) body, or a sequence of such images. The medical images may be two dimensional or higher dimensional volumetric images representing the internal structure of a human or animal body (or a sequence of such images). Volumetric images and are formed of voxels. A voxel in a three dimensional volumetric image is analogous to a pixel in a two dimensional image and represents a unit of volume.

Although described with reference to medical images the techniques described below may also be applied in other fields, for example registration of satellite data, registration of sonar data, topographical modeling or other computer vision processes.

The term 'image element' is used herein to refer to a pixel in a two dimensional image, a voxel in a three or higher dimensional image or time varying sequence of images, or groups of pixels or voxels such as blobs, patches, or other collections of two or more pixels or voxels. Each image element has one or more values associated with it. Each value represents a property such as intensity or color. The property can depend on the type of medical image device generating the image. In an example the image intensities can be related to the density of the tissue at a given portion of the image or the proportion of water present in the material.

Figure 1:
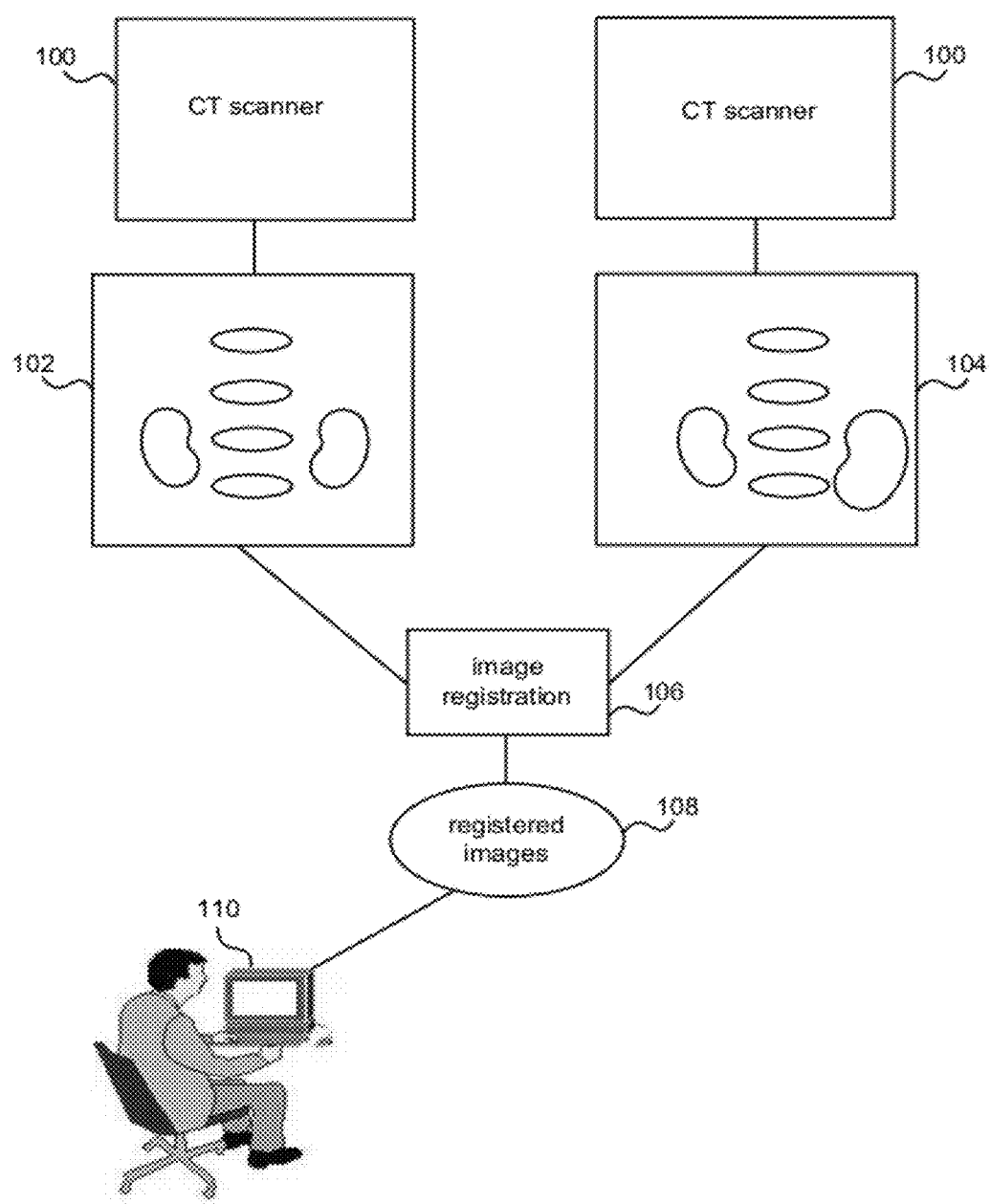
FIG. 1 is a schematic diagram of a medical image registration system.

FIG. 1 is a schematic diagram of a medical image registration system comprising a computer implemented image registration system 106. In an example a user 110, for example a doctor, may wish to examine multiple images 102, 104, for example for patient follow up or to plan surgery.

The image registration system 106 is arranged to take a reference image 102 of two or higher dimensions and a target image 104 which is also of two or higher dimensions and perform a transformation so that the second medical image is registered to the first medical image or vice versa. In an example the reference image and the target image may depict the same patient. The images may be taken using different equipment (e.g. be multi-modal) or at different times or from a different angle. The image registration system enables these variations to be removed before medical staff, other users or automated processes compare the images.

In an example a plurality of images may be registered to the reference image. For example a doctor may wish to perform a multi-modal examination of a patient using e.g. an X-ray, a computed tomography (CT) scan and a positron emission tomography (PET) scan. Once the images have been registered to the reference image, the user 110 is able to compare the registered images 108 output from the image registration system 106 in order to look for any differences. For example the user may examine the registered images to look for differences. In an example, the registered images 108 may show a change in the size or shape of an organ over time, which may indicate injury, illness or another problem with the organ. Multi-modal registered images may also be used for further automated analysis. For example, scientific data mining or fast visualization. An automated organ recognition process may be applied to the registered images with multi-modal features in order to achieve higher accuracy than using such an organ recognition process prior to image registration.

In some examples described below the images are of at least three dimensions although this is not essential. The image registration system 106 may also be used with two-dimensional images.

The image registration system may display the output images in a plurality of different ways. In an example the registered images 108 may display the reference image 102 as a black and white or color image, with the target image 104 overlaid as a contour map or a partially transparent image. In another example the registered images may be displayed as an image sequence. The registered images 108 may be displayed in a pre-specified manner or the user 110 may select different ways of displaying the image. For example the user 110 may choose to first display a target image as a contour overlay on the reference image and then choose to display two or more of the images in sequence. For example blinking the images. In some embodiments the estimated uncertainty in the image registration may also be displayed by varying the color or degree of transparency for example. This uncertainty value may be provided as a variance or standard deviation value for example and provides an indication of how certain the image registration system 106 is that the registration of the target image 104 to the reference image 102 is correct.

In an example the medical images may be from a CT scanner 100. However, the images may be produced by many types of medical equipment such as magnetic resonance imaging (MRI) scanners, computed tomography (CT) scanners, single photon emission computed tomography (SPECT) scanners, positron emission tomography (PET) scanners and ultrasound scanners.

Figure 2:
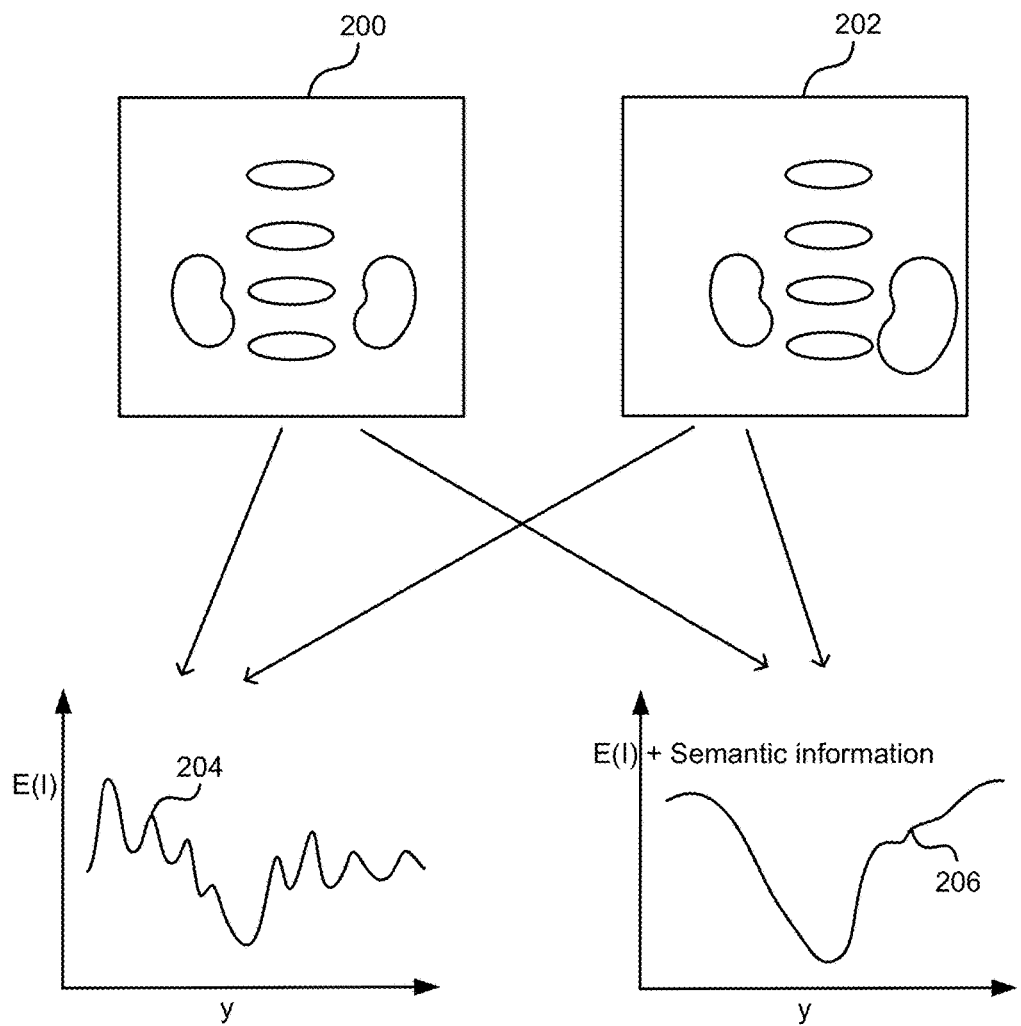
FIG. 2 is a schematic diagram of a pair of medical images to be registered and using either of two types of energy function which are shown schematically.

FIG. 2 is a schematic diagram of a pair of medical images to be registered and two types of energy function which are shown schematically. Many common techniques for registration of images cast the linear registration problem as the minimization of a global energy function based on intrinsic image properties, for example an energy function based on the image intensity E(I). In an example of this technique a target image 202 can be registered to a reference image 200 using a minimization of the energy function 204. However, the minimization step of algorithms which minimize an energy function based on only image intensities and without using semantic information about the image content can become caught in local minima, leading to unsatisfactory results.

In another example the images 200, 202 can be registered using an optimization of an energy function 206 based on an intrinsic image property and other semantic information E(I+semantic information). For example, the semantic information may be information about the types of anatomical structures or organs in a medical image and certainty of that information. The semantic information may be a probability measure, for example the probability of an organ being located in a certain part of an image. In other examples the semantic information may be classification information, segmentation information or other information about the content of the image. The addition of semantic information as a term in the energy function enables an energy function to be computed which has a more clearly defined global point of inflection (minimum or maximum) to be found and improves the robustness of image registration.

In an example an automatic image registration system comprises an input arranged to receive a first image and a second image both images being of objects and with at least part of one object being common to both images. For example, the images may be medical images of a patient's thorax both showing the patient's lungs but from slightly different viewpoints. The system may have a processor arranged to compute semantic information for each of the first and second images, the semantic information comprising information about the types of objects in the images and the certainty of that information. In some cases this semantic information about the image content is provided as probability maps described in more detail below. However, other formats may be used for the semantic information. The processor may be further arranged to find a mapping to register the first and second images which takes into account the intensities of the image elements of the images and also takes into account the semantic information in a manner which is weighted by the certainty of that semantic information. This gives improved quality of image registration.

In an example, a method of automatic image registration comprises receiving a first image and a second image both images being of objects and with at least part of one object being common to both images. For each of the first and second images a probability map is computed comprising, for each image element, a probability that the image element is of a specified object. A mapping may then be found to register the first and second images by optimizing an energy function which is a function of the intensities of the first and second images and also of the probability maps.

Figure 3:
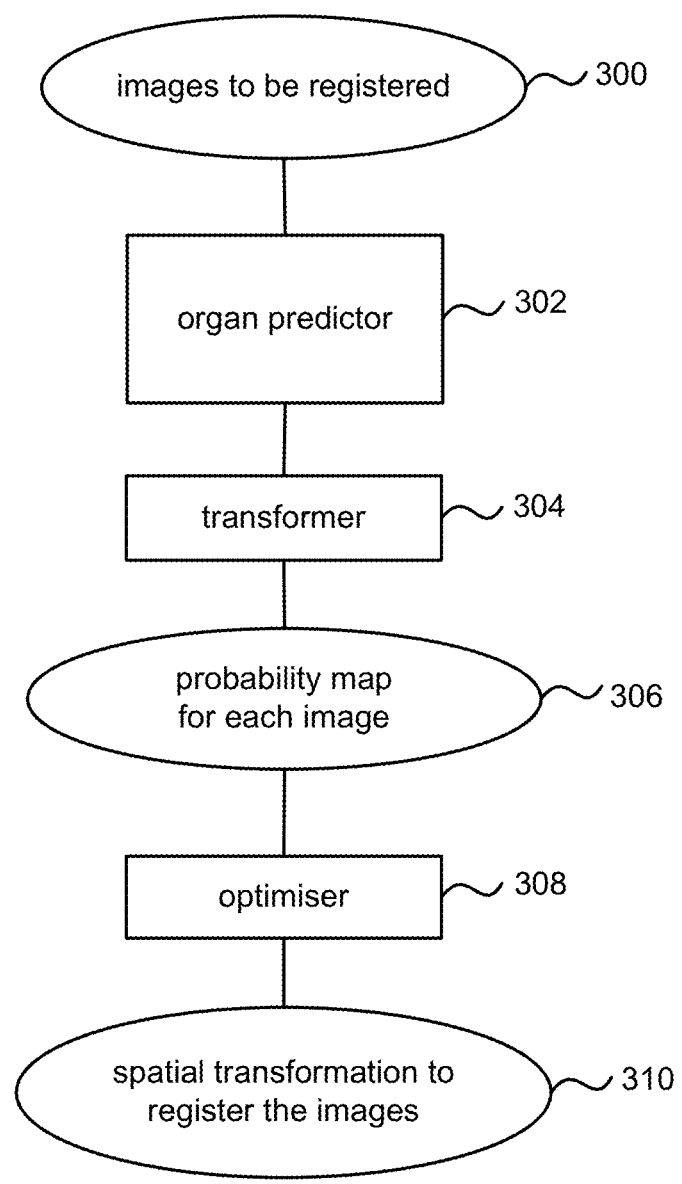
FIG. 3 is a flow diagram of an example method of image registration at a medical image registration system.

FIG. 3 is a flow diagram of an example method of image registration at the medical image registration system. For example the image registration system of FIG. 1. The images to be registered 300 are input to an organ predictor 302. The organ predictor may predict the location of an organ or other anatomical structure in an image. For example the organ predictor 302 may be arranged to provide an estimated region or bounding box for each organ it detects, together with associated uncertainties. In an example where the input images are three-dimensional images the estimated region is a volume which tightly contains or encompasses an organ; it may be a box or any other 3D form. In other examples the organ predictor may be configured to label or segment the images.

In an embodiment the organ predictor comprises a regression forest. A regression forest is an ensemble classifier comprising a plurality of trained regression trees. An ensemble of many randomly trained regression trees (a regression forest) yields improved generalization over a single tree which may suffer from over-fitting. Regression trees differ from classification trees in that they provide real valued continuous output as opposed to a class to which an object belongs. During the training process, the number of trees is fixed. In one example, the number of trees is three, although other values can also be used. The choice of the number of trees and the depth of those trees depends on the application domain as well as factors such as the computational resources available.

The use of a regression forest to predict organ locations is described in more detail with reference to FIGS. 4-7. In a non-exhaustive list of examples the organ predictor may alternatively be; an alternative type of trained decision forest, for example a classification forest system; a vector machine such as a support vector machine (SVM); a relevance vector machine (RVM); in addition adaptive boosting techniques (e.g. Ada boost) may be used.

Figure 9:
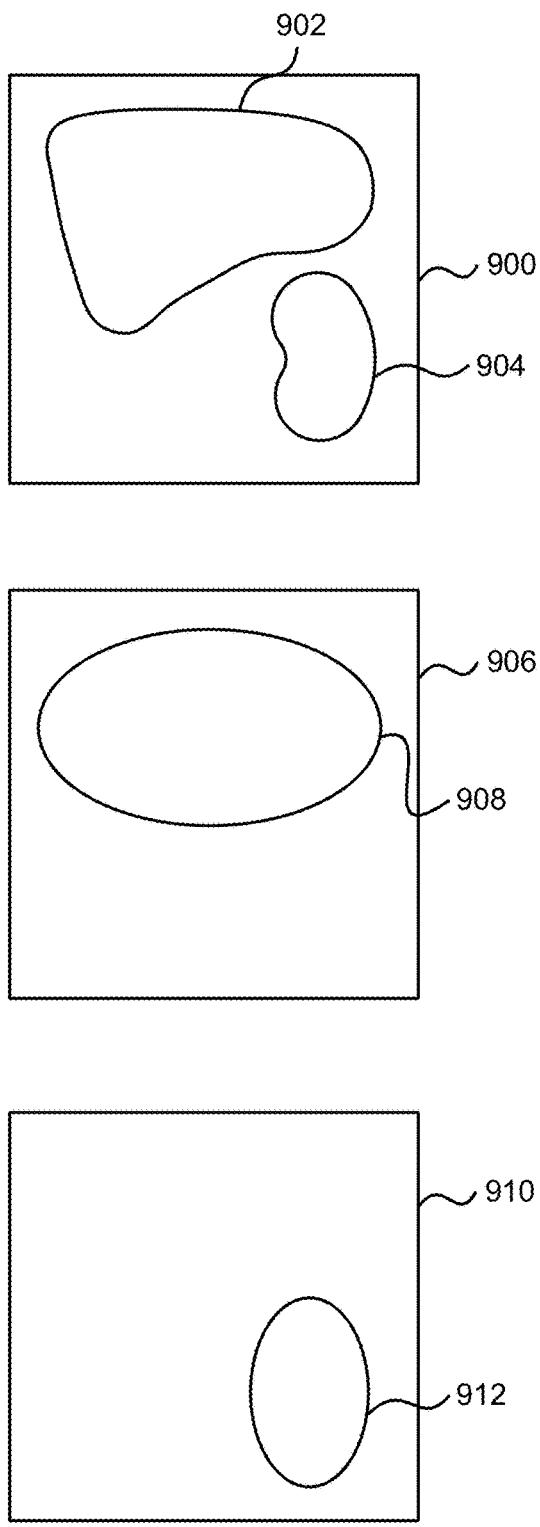
FIG. 9 is an example of probability maps computed from an input image.

Predictions received from the organ predictor 302 for the location of an organ in an image 300 are used as input to a transformer 304. The transformer 304 is used to place the semantic information into a form which may be readily used as part of a process for finding a mapping between the images. For example, the transformer 304 may transform the output of the organ predictor into a probability map 306 for each image. A probability map can be considered as an image (which may be of 2, 3 or higher dimensions) where each image element location holds one or more values, each value corresponding to the probability that that image element depicts a specified organ. Each element of the probability map may correspond to an image element in the input image, or may be of different esolution. For example each element in the probability map may be an average of the probability at several image elements. In some examples herein the probability map is a voxel-wise probability map. A color table of a probability map may be used to visualize the probability value. An example of probability maps is shown in FIG. 9.

In an example, the probability maps 306 for each image are used by an optimizer 308 to compute a spatial transformation 310 to register the input images. For example the optimizer 308 attempts to find an optimal solution of an energy function as is described above with reference to FIG. 2. This energy optimization problem may be formulated from the image intensity and the semantic information in order to find a global point of inflection. In an example the registration problem is an energy optimization problem. An example of energy optimization is described with reference to FIG. 10.

Figure 4:
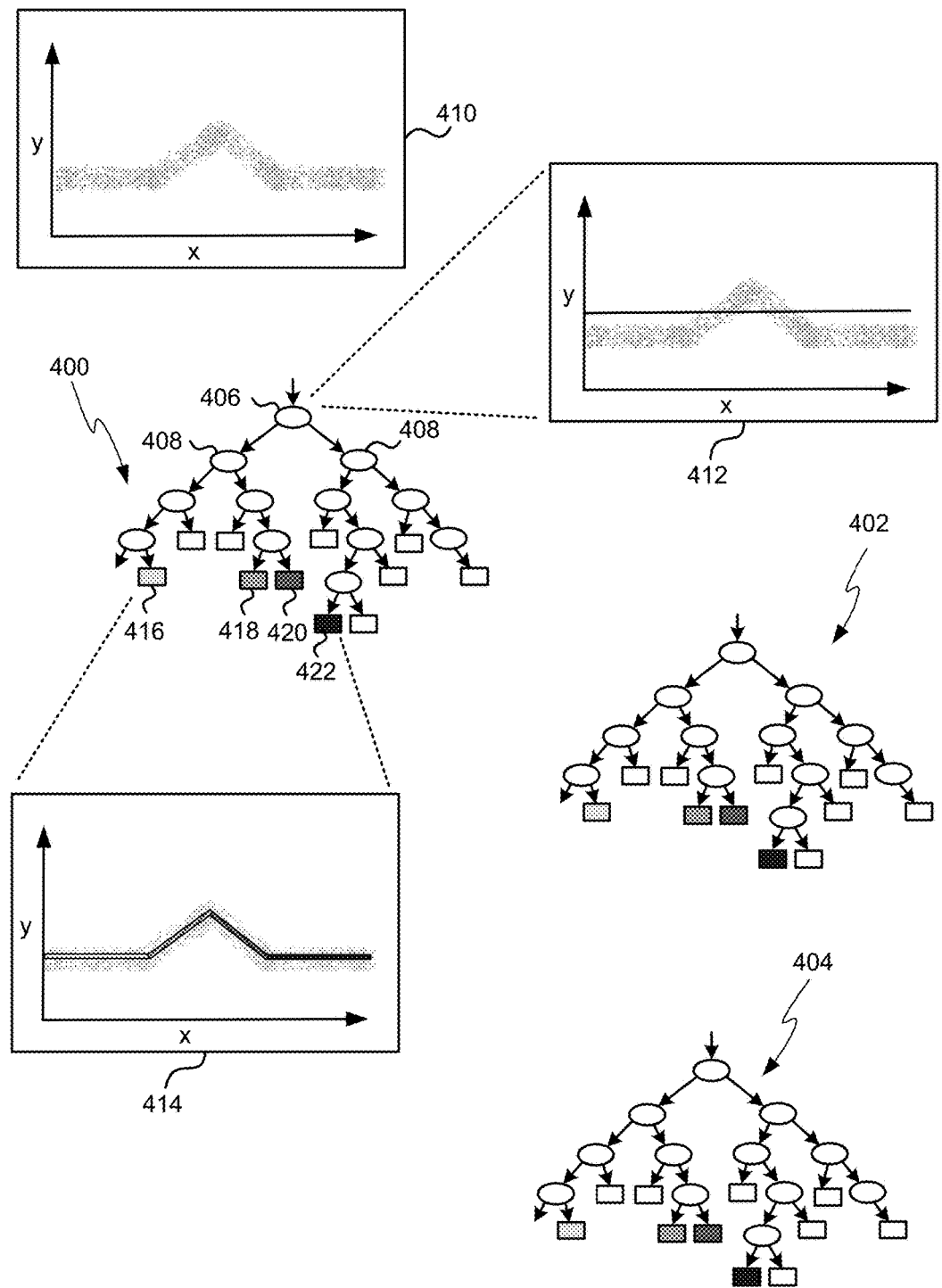
FIG. 4 is a schematic diagram of an example portion of a decision forest.

FIG. 4 is a schematic diagram of an example portion of a random forest which may be a random regression forest, random decision forest or other type of random forest. The illustrative decision forest of FIG. 4 comprises three decision trees: a first tree 400 (denoted tree $\Psi_1$); a second tree 402 (denoted tree $\Psi_2$); and a third tree 404 (denoted tree $\Psi_3$). Each decision tree comprises a root node (e.g. root node 406 of the first decision tree 400), a plurality of internal nodes, called split nodes (e.g. split node 408 of the first decision tree 400), and a plurality of leaf nodes (e.g. leaf node 410 of the first decision tree 400).

Highly non-linear mappings are handled by splitting the original problem into a set of smaller problems which can be addressed with simple predictors. FIG. 4 shows an illustrative 1D example where the goal is to learn an analytical function to predict real-valued output. A single linear function fits the data badly. For example a single linear function 412 as output by root node 406 does not fit the data. A set of training pairs (x,y) 410 is given to a tree, for example tree 400, at the root node, for example root node 406. Each node in the tree is designed to split the data so as to form clusters where accurate prediction can be performed with simpler models (e.g. linear in this example). Using more tree levels may yield more accurate fit of the regressed model. For example the training pairs 410 may be modeled 414 using a combination of linear regressors from nodes 416 to 422 which fit the data well. In operation, each root and split node of each tree performs a binary test on the input data and based on the result directs the data to the left or right child node. Formally each node performs the test $\zeta > f(x) > \tau$, with $\zeta, \tau$ scalars. Based on this result each data point is sent to the left or right child node 408.

In an example where the decision forest is a regression forest the leaf nodes store continuous parameters $\eta_S$ characterizing each regressor. The regressor may be linear, constant, Gaussian, quadratic or any other functional form. This is in contrast to classification or decision forests where the predicted variables are discrete. Complex non-linear mappings may be modeled via a hierarchical combination of many simple linear regressors. More tree levels yield smaller clusters and smaller fit errors but may overfit the input data. The manner in which the parameters used by each of the split nodes are chosen and how the leaf node probabilities are computed is described with reference to FIGS. 5 and 6.

The tree based regressor allows multiple anatomical structures to be dealt with simultaneously which encourages feature sharing between anatomical structures and therefore better generalization. For example, the presence of a lung may be indicative of the presence of the heart. In contrast to classification based approaches which can localize the organ centers but not the organ extent, the continuous model estimates the position of the walls of the bounding box containing each organ, thus achieving simultaneous organ localization and extent estimation.

As described in the examples below a regression forest algorithm can incorporate atlas information within the compact tree based model. Atlas-based techniques have conceptual simplicity. An atlas is a hand-classified image, which is mapped to a subject image by deforming the atlas until it closely resembles the subject. This technique is therefore dependent on the availability of good atlases. Robustness can be improved by multi-atlas based techniques, however this can be computationally inefficient. In addition, the conceptual simplicity of such algorithms is in contrast to robust cross-image registration. By incorporating atlas information into a regression model greater efficiency and robustness is achieved than using multiple atlases and anatomy localization is achieved more quickly.

In the example described with reference to FIG. 4 a regression forest was used to estimate a two-dimensional continuous vector representing a line. However, a regression forest may be used to estimate variables with a plurality of dimensions. In an example where the locations of organs in a volumetric image are being estimated the output is a six dimensional vector $b_c$ per organ, for a total of 6|C| continuous parameters. In an embodiment the anatomical structures which can be identified include but are not limited to C(={heart, liver, spleen, left lung, right lung, left kidney, right kidney, gall bladder, left pelvis, right pelvis}.

Figure 5:
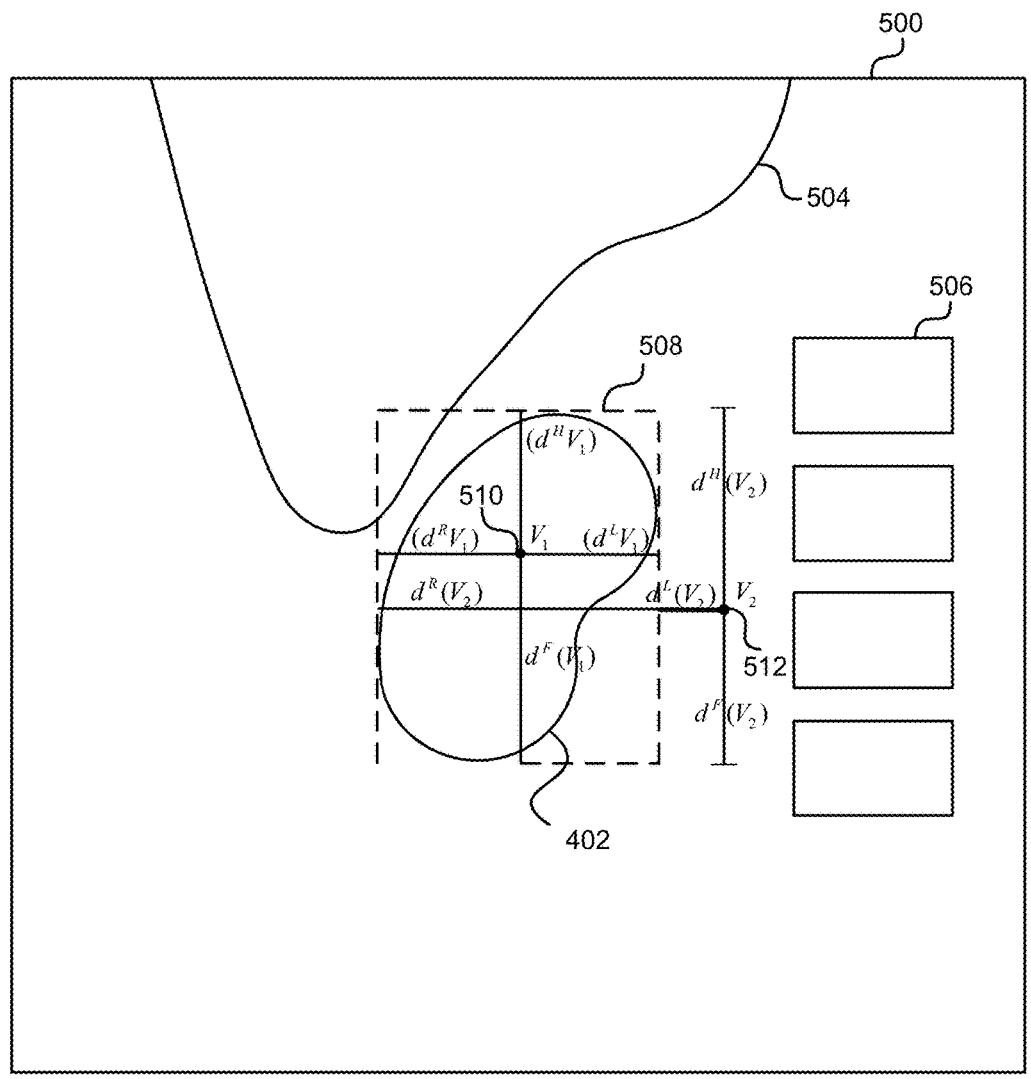
FIG. 5 is an example of a training image for estimating organ positions.

FIG. 5 is an example of a training image for estimating organ positions. Note that the schematic diagram of FIG. 5 is shown in two dimensions only, for clarity, whereas an example volumetric image is three-dimensional. The medical image 500 comprises a representation of several organs, including a kidney 502, liver 504 and spinal column 506, but these are only examples used for the purposes of illustration. Other typical organs that can be shown in images and identified using the technique described herein include (but are not limited to) the head, heart, eyes, lungs, and major blood vessels. A bounding box 508 is shown drawn (in dashed lines) around the kidney 502. Note that in the illustration of FIG. 5 the bounding box 508 is only shown in two dimensions, whereas in a volumetric image the bounding box 508 surrounds the kidney 502 in three dimensions.

Each voxel v (for example $v_1, v_2$ 510, 512) in the training volume can be associated with an offset $d_c(v)=(d_c^l, d_c^r, d_c^h, d_c^f, d_c^a, d_c^p) \in \mathbb{R}^6$ with respect to the bounding box $b_c$ 508 for each class c∈C. Examples of offsets are shown in FIG. 5 for two voxels $v_1$ 510, and $v_2$ 512. The offset for $v_1$ 510 is given by $d(v_1)=(d_1^l, d_1^r, d_1^h, d_1^f)$ and for $v_2$ 512 is given by $d(v_2)=(d_2^l, d_2^r, d_2^h, d_2^f)$ the other two components of the offset vectors $(d_1^a, d_1^p)$ and $(d_2^a, d_2^p)$ which would be present in a 3-D volumetric image are not shown in the two dimensional representation in FIG. 5.

In an embodiment all voxels in a test CT volume contribute with varying confidence to estimating the position of the walls of a bounding box. In other embodiments only a selection of voxels may contribute. Some clusters of voxels may predict the position of an organ with high confidence. This may be the case even if the voxel does not comprise part of the organ, for example, voxel clusters that are part of the ribs or vertebrae may predict the position of the heart with high confidence. During testing these clusters may be used as references for the location of anatomical structures. Voxels can be clustered together based on their appearance, their spatial context, their intensity value, their confidence levels or any other appropriate measure. The feature selection and parameter regression can be undertaken using a multi-class random regression forest e.g. an ensemble of regression trees trained to predict the location and size of all desired anatomical structures simultaneously.

Figure 6:
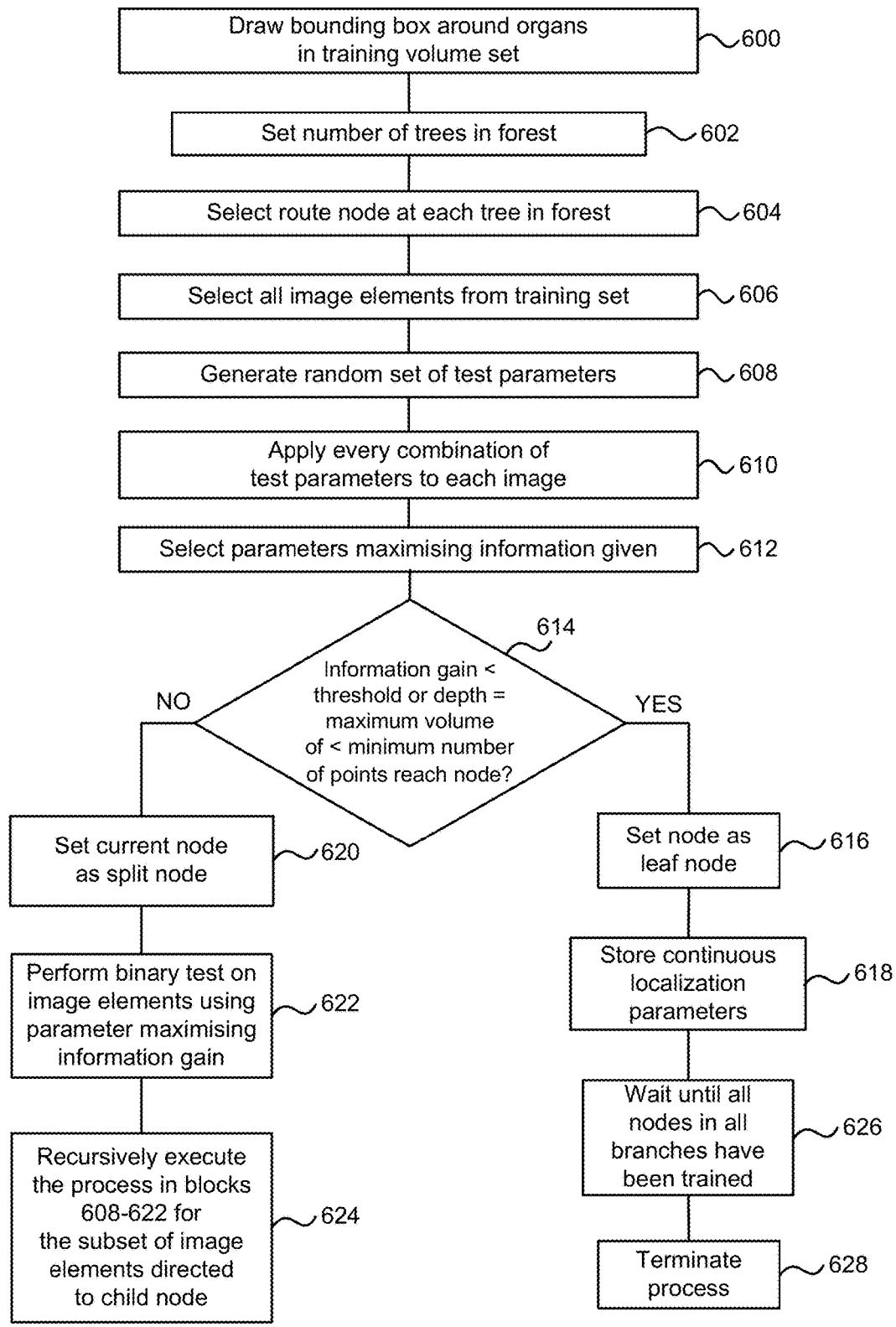
FIG. 6 is a flow diagram of an example method of training a regression forest.

FIG. 6 is a flow diagram of an example method of training a regression forest. FIG. 6 describes one example method of training a regression forest. Other methods may be used such as breadth first training where a whole level of the tree is trained at once or other methods. A training set of labeled volumes can be created with associated ground-truth organ bounding boxes. In an example the training set is created from a subset of all the volumes. The training set may be created by hand drawing a bounding box 600 which may be a cuboid in the case of a 3D image or a rectangle in the case of a 2D image, centered on the organ of interest. In an example there may be more than one organ of interest per image. The bounding box can also be extended in the temporal direction in the case of a sequence of images.

The bounding box may be drawn using a dedicated annotation tool, which is a software program enabling fast drawing of the bounding boxes from different views of the image (e.g. axial, coronal, saggital and 3D views). The bounding boxes may be drawn manually. In some embodiments radiologists can be used to validate that the labeling is anatomically correct.

The number of regression trees to be used in the regression forest is set 602. A regression forest is a collection of regression trees. The forest is composed of T trees denoted $\Psi_1, \ldots, \Psi_t, \ldots, \Psi_T$ with t indexing each tree. During the training process the number of trees is fixed. In an example the number of trees is three (for example the regression forest of FIG. 4) but other values may also be used. All trees are trained in parallel. However, the trees may also be trained separately.

At each tree in the forest the root node (e.g root node 406) is selected 604. All image elements from each of the training images are then selected 606. An image element in an image V is defined by its co-ordinates v=(x,y,z).

The manner in which the parameters used by each of the split nodes are chosen and how the continuous parameters are stored and computed is now described.

A random set of test parameters are generated 608 for use by the binary test performed at the root node 406. In one example the binary test is of the form: $\zeta > f(v;\theta) > \tau$, such that $f(v;\theta)$ is a function applied to image element at position v and its surrounding image elements with parameters θ and with the output of the function compared to threshold values ζ and τ. If the result of $f(v;\theta)$ is in the range between ζ and τ then the result of the binary test is true, otherwise the result of the binary test is false. In other examples, only one of the threshold values can be used such that the binary test is true if the result of $f(v;\theta)$ is greater than (or less than) a threshold value. In the example described here, the parameter θ defines a visual feature of the image.

Anatomical structures can be difficult to identify in medical images because different organs can share similar intensity values, e.g. similar tissue density in the case of CT and X-Ray scans. Thus, local intensity information is not sufficiently discriminative to identify organs and as described above this may lead to the optimization of the energy function becoming stuck in local minima.

The parameters θ for the function $f(v;\theta)$ are randomly generated during training. The process for generating the parameters θ comprises generating, for example, a randomly-sized box (a cuboid box for 3D images, or a rectangle for 2D images, both of which can be extended in the time-dimension in the case of a sequence of images) and a spatial offset value. All dimensions of the box are randomly generated. The spatial offset value is in the form of a two- or three-dimensional displacement. In other examples, the parameters θ can further comprise one or more additional randomly generated boxes and spatial offset values. In alternative examples, differently shaped regions (other than boxes) or offset points can be used. In an example, only a single signal channel (e.g. intensity only) is used for all boxes. In other examples the channel may be the magnitude of the intensity gradient or a more complex filter can be used.

Given the above parameters θ, the result of the function $f(v;\theta)$ is computed by aligning the randomly generated box with the image element of interest v such that the box is displaced from the image element v in the image by the spatial offset value. The value for $f(v;\theta)$ is then found by summing the values for the signal channel for the image elements encompassed by the displaced box (e.g. summing the intensity values for the image elements in the box). Therefore, for the case of a single box, $f(v;\theta)=\Sigma_{q\in F}I(q)$, where q is an image element within box F. This summation is normalized by the number of pixels in the box. In the case of two boxes, $f(v;\theta)$ is given by: $f(v;\theta)=|F_1|^{-1}\Sigma_{q\in F_1}I(q)-|F_2|^{-1}\Sigma_{q\in F_2}I(q)$, where $F_1$ is the first box, $F_2$ may be a second box or, in other examples, $F_2$ may be an empty set for unary features. Again, these two summations are normalized separately by the respective number of image elements in each box.

The result of the binary test performed at the root node or split node determines which child node an image element is passed to. For example if the result of the binary test is true, the image element is passed to a first child node, whereas if the result is false, the image element is passed to a second child node.

The random set of test parameters generated comprise a plurality of random values for the function parameters θ and the threshold parameter values ζ and τ. In order to inject randomness into the decision trees, the function parameters θ of each split node are optimized over only a randomly sampled subset Θ of all possible parameters. For example, the size of the subset can be 100. This is an effective way of increasing generalization.

Every combination of test parameter 610 is applied to each image element in the training images. In other words, all available values θ∈Θ are tried one after another, in combination with all available values of ζ and τ for each image element in each training image. For each combination, the information gain, also known as the relative entropy is calculated by selecting parameters maximizing information 612 given.

For example, as described above, each voxel v in the training volume is associated with an offset $d_c(v)=(d_c^l, d_c^r, d_c^h, d_c^f, d_c^a, d_c^p)\in\mathbb{R}^6$ with respect to the bounding box $b_c$ for each class c∈C where $b_c(v)=\hat{v}-d_c(v)$ and $\hat{v}=(v_x,v_x,v_y,v_y,v_z,v_z)$. Node optimization may be executed by optimizing an information gain measure. An example of an information gain measure is $IG=H(S)-\Sigma_{i=\{L,R\}}\omega_i H(S_i)$ where H denotes entropy, S is the set of training points reaching the node and L,R denote the left and right child nodes.

In an example where the decision forest is a classification forest the entropy is measured over discrete class labels. In contrast, in an example where the decision forest is a regression forest the purity of the probability density of the real valued predictions is measured. For a single class c the distribution of the vector $d_c$ can be modeled at each node as a multivariate Gaussian. For example $p(d_c)=\mathcal{N}(d_c;\bar{d}_c,\Lambda_c)$, with the matrix $\Lambda_c$ encoding the covariance of $d_c$ for all points in S. In other examples the regression forest may alternatively be used with a non-parametric distribution.

The differential entropy of a multivariate Gaussian can be shown to be $$H(S) = \frac{n}{2}(1 + \log(2\pi)) + \frac{1}{2}\log|\Lambda_c(S)|$$

where n is the number of dimensions. In examples herein where the image are volumetric images n=6, in examples where two dimensional images are described n=4. However, n may take any appropriate value. The regression information gain in this example is therefore $IG=\log|\Lambda_c(S)|-\Sigma_{i=\{L,R\}}\omega_i \log|\Lambda_c(S_i)|$.

In examples where the information gain is adapted to handle multiple organs simultaneously the information gain can be adapted to $IG=\Sigma_{c\in C}(\log|\Lambda_c(S)|-\Sigma_{i=\{L,R\}}\omega_i \log|\Lambda_c(S_i)|)$. This can be rewritten as;

$$\log|\Gamma_c(S)|-\Sigma_{i=\{L,R\}}\omega_i \log|\Gamma(S_i)| \text{ with } \Gamma=\text{diag}(\Lambda_1,\ldots,\Lambda_c,\ldots,\Lambda_{|C|}) \quad (1)$$

Maximizing (1) minimizes the determinant of a 6|C|×6|C| covariant matrix Γ thus decreasing the uncertainty in the probabilistic vote cast by each cluster of voxels on each organ pose. As an alternative to information gain other criteria can be used, such as Gini entropy or 'two-ing' criterion.

In some embodiments, if the value for the maximized information is less than a fixed threshold 614 then this indicates that the further expansion of the tree will not provide significant benefit. This gives rise to asymmetrical trees which naturally stop growing when no further nodes are needed. In other examples the node stops growing when a maximum tree depth is reached or too few points reach the node. In an example the maximum depth of the trees is 7 levels, although other values can be used. In an example the maximum depth of the trees is chosen to minimize the mean error. Where further nodes will not provide significant benefit the node is set as a leaf node 616. At each leaf node the predictions for the continuous localization parameters are stored 618. For example learned mean $\bar{d}$ (with d=$(d_1,\ldots,d_c,\ldots,d_{|C|})$ and covariance Γ.

If the value for the maximized information gain is greater than or equal to the threshold and the tree depth is less than the maximum value then the current node is set as a split node 620. If the current node is a split node it has child nodes and the process moves to training these child nodes. Each child node is trained using a subset of the training image elements at the current node. The subset of image elements sent to a child node is determined using the parameters θ*, ζ* and τ* that maximized the information gain. These parameters are used in the binary test and the binary test performed 622 on all image elements at the current node. The image elements that pass the binary test form a first subset sent to a first child node and the image elements that fail the binary test form a second subset sent to a second child node. After training the $j^{th}$ split node remains associated with the feature $\theta_j$ and the thresholds $\zeta_j,\tau_j$.

For each of the child nodes, the process as outlined in blocks 608-622 of FIG. 6 is recursively executed 624 for the subset of image elements directed to the respective child node. In other words, for each child node, new random test parameters are generated 608, applied 610 to the respective subset of image elements directed to the respective child node, parameters maximizing the information gain are selected 612, and the type of node (split or leaf) determined 614. If it is a leaf node then the current branch of recursion ceased. If it is a split node 620, binary tests 622 are performed to determine further subsets of image elements and another branch of recursion starts. Therefore this process recursively moves through the tree, training each node until leaf nodes are reached at each branch. As leaf nodes are reached the process waits 626 until all the nodes in all the branches have been trained. In other examples the same functionality can be attained using alternative techniques to recursion. Once the leaf nodes have been reached for all trees in the forest the training process is complete and the process terminated 628.

Equation (1) is an example of a way of maximizing the confidence of the desired continuous output for all organs without intermediate voxel classification. Furthermore, the example gain formulation enables testing between different context models. For example imposing a full covariance Γ may allow correlations between all walls in all organs, with possible over-fitting consequences. In another example assuming a diagonal Γ (and diagonal class covariances $\Lambda_c$) may lead to uncorrelated output predictions. In a further example Γ may be sparse but correlations between selected subgroups of classes may be enabled to capture, for example, class hierarchies or other forms of spatial context.

Figure 7:
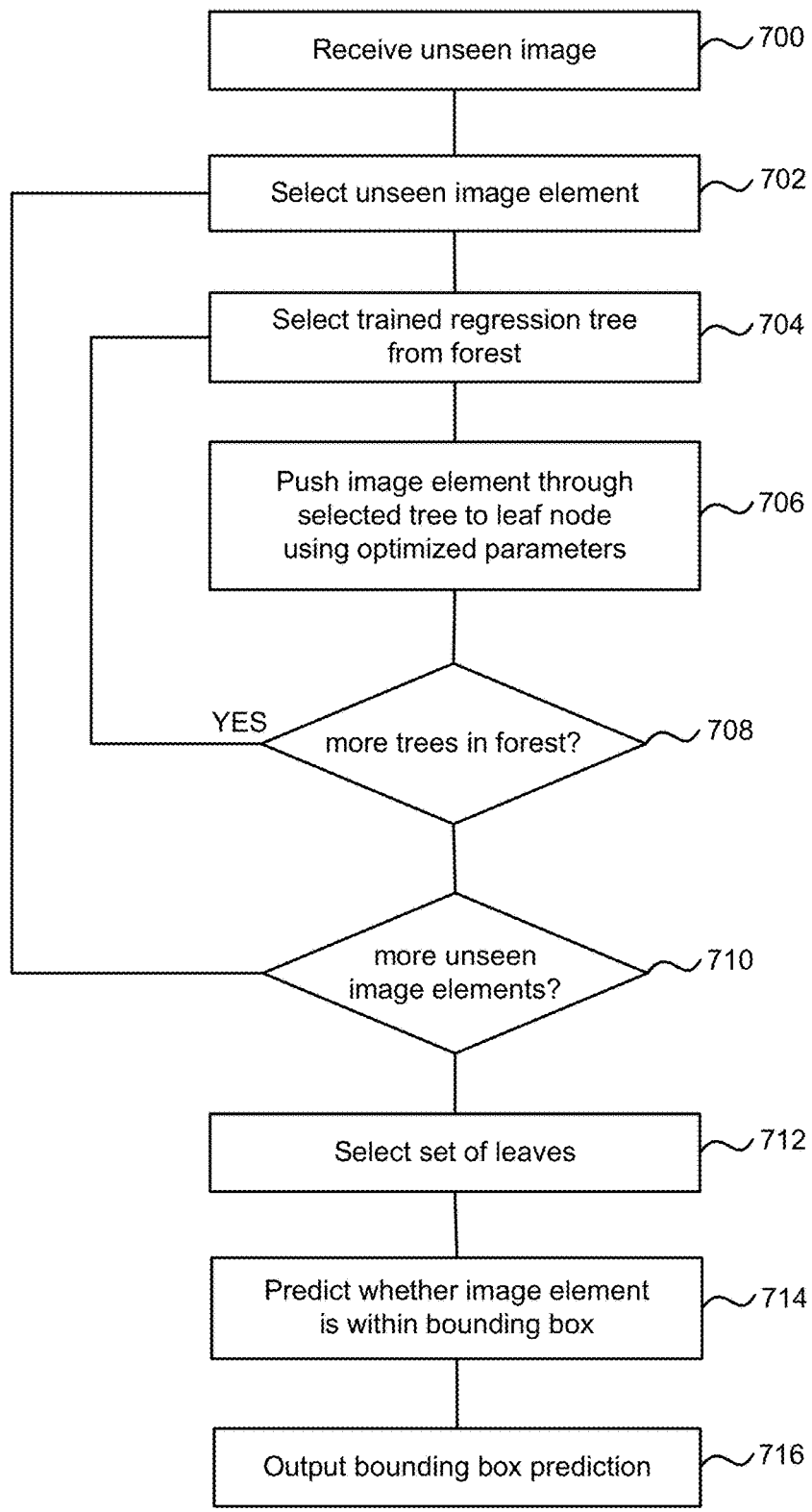
FIG. 7 is a flow diagram of an example method for predicting organ locations using a trained regression forest.

FIG. 7 is a flow diagram of an example method of predicting organ locations in a previously unseen image. In an example a regression forest which has been trained as described in FIG. 6 can be used. An unseen image is received 700 at the organ predictor 302. An image is referred to as unseen to distinguish it from a training image which has the organ presence and/or bounding box already identified.

An image element from the unseen image is selected 702 and a trained regression tree from the regression forest is also selected. The selected image is pushed 706 through the selected regression tree (in a manner similar to that described above with reference to FIG. 6) such that it is tested against the trained parameters at a node and then passed to the appropriate child in dependence on the outcome of the test. The process is repeated until the image element reaches a leaf node l(v) with l indexing leaves across the whole forest.

If it is determined 710 that there are more regression trees in the forest, then a new regression tree is selected 704, the image element is pushed through the tree until a leaf node is reached. This is repeated until it has been performed for all the regression trees 710 in the forest. In an example an image element can be pushed through the plurality of trees in the regression forest in parallel. It is determined 712 whether further unanalyzed image elements are present in the unseen image, and if so another image element is selected and the process repeated. In an example the process can be repeated for every voxel in the volume v∈v.

In an example the stored prediction at the leaf node $p(d_c|l) = \mathcal{N}(d_c; \bar{d}_c, \Lambda_c)$ for class c also defines the posterior for the absolute bounding box probability $p(b_c|l) = \mathcal{N}(b_c; \bar{b}_c, \Lambda_c)$ since $\bar{b}_c(v) = \hat{v} - \bar{d}_c(v)$. A set of leaves $\bar{\mathcal{L}}$ can be selected. In an example $\bar{\mathcal{L}}$ may be a subset of all forest leaves. For example $\bar{\mathcal{L}}$ may be the set of leaves which has the smallest uncertainty (for each class c) and contain a specified threshold level of all test image elements. In an example the specified threshold level is 1%. However, another level may be used. The posterior probability for $b_c$ can also be computed. In an example the posterior probability is $$p(b_c) = \sum_{l \in \bar{\mathcal{L}}} p(b_c | l) p(l).$$

In the above example the most confident leaves are used to predict the output. For example $p(l) = 1/|\bar{\mathcal{L}}|$ if $l \in \bar{\mathcal{L}}$, 0 otherwise, irrespective of where in the forest they come from.

In an example, whether or not an image element is within the bounding box can be predicted 714 from the probability. In an example the organ is considered to be present in the image if $p(b_c = \bar{b})c) > \beta$. In an example $\beta = 0.5$, however any threshold value may be used. In another example the organ is considered to be present by determining the maximum probability in the overall probability distribution. The prediction 716 for the absolute bounding box position of the $c^{th}$ organ can given by the expectation $\bar{b}_c = \int_{b_c} b_c p(b_c) db_c$. In an example the predictions for an image element is assigned to the image element for future use.

Compared to atlas based techniques the examples methods described herein have a reduced error, and are comparably fast and more robust when computing bounding box predictions. As described above in many cases atlas based techniques become stuck in local minima which can cause inaccurate results. In some examples a local registration step may be added to atlas based techniques, however this may not improve cases stuck in local minima and significantly increases the runtime of the algorithm. In addition regression forest based techniques require significantly less memory than atlas based techniques. A regression based approach can compute the position of each wall rather than just the organ centre, thus enabling approximate extent estimation. Regression techniques as described in the examples herein are also more accurate than classification based approaches.

Figure 8:
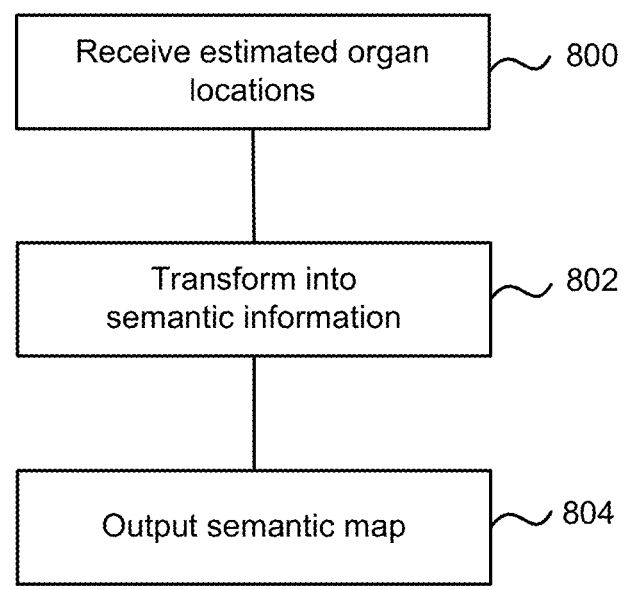
FIG. 8 is a flow diagram of an example method of computing probability maps.

FIG. 8 is a flow diagram of an example method of computing probability maps. Probability maps are an example of the type of semantic information which can be used to formulate an energy function. Estimated organ locations are received 800 from the organ predictor 302. In an example these can be the prediction for the absolute bounding box position of the $c^{th}$ organ given by the expectation $b_c = \int_{b_c} b_c p(b_c) db_c$ as computed using a trained regression forest algorithm as described above with reference to FIG. 7. The outputs from the organ predictor can be transformed into a map of semantic information 802. In an example the semantic information is a probability for each image element that it lies within an organ bounding box. In an embodiment the probability map can be computed from:

$$P(B_i | x) = \frac{1}{z} \prod_{j=1}^{3} \left(1 + \exp\left(\frac{x_j - u_i^j}{\sigma_i^u}\right)\right)^{-1} \left(1 + \exp\left(\frac{l_i^j - x_j}{\sigma_i^l}\right)\right)^{-1} \quad (2)$$

where $B_i$ represents the $i^{th}$ bounding box, $x = (x_1, x_2, x_3)$ denotes image element position, $u_i^j$ and $l_i^j$ if are the upper and lower faces of $B_i$ in the j direction and $\sigma_i^u$ and $\sigma_i^l$ are the standard deviations for these coordinates as estimated by the organ predictor.

The semantic information may be output in the form of a probability map. In some embodiments a probability maps can be a volumetric probability map. In an example a plurality of probability maps can be output for each input image. For example a probability map can be output which illustrates the probability that an organ lies within one bounding box, for example the bounding box surrounding the left kidney. In an example one probability map can be output for each predicted organ bounding box. In another example an aggregate probability map can be output which illustrates the probability that an image element lies within any predicted organ bounding box.

FIG. 9 is an example of computed probability maps from an input image. In an example input image 900 may be a CT image showing the liver 902 and the right kidney 904. However, image 900 may be any appropriate image. In an example the output of the transformer 304 is a first probability map 906 which shows the likelihood of each image element in the input image 900 being inside the liver bounding box 908 and a second probability map 910 which shows the likelihood of each image element in the input image 900 being inside the right kidney bounding box 912. The probability maps are represented schematically using elliptical shapes to indicate regions where probability values may increase towards the center of those regions. The transformer 304 may output more than two probability maps. For example the transformer may output a probability map for each bounding box prior in the image.

In other embodiments the probability maps may be aggregated probability maps which display the likelihood that an image element is inside any of the estimated bounding boxes. For example a probability map may display the probability that an image element belongs to either the liver or kidney or any other bounding box in the input image 900.

In an example color tables of the probability maps are scaled according to the likelihood that an image element is within a bounding box. For example in an example where there are 256 colors in a color table, an image element with a probability of being inside the bounding box of 1.0 is set as color 256 and an image element with a probability of being inside the bounding box of 0 is set as color 1. In other examples the colors may be scaled differently, for example logarithmically or according to a gamma scaling.

Although the probability maps as described in FIG. 9 are displayed to the user, this is not essential. In other embodiments the probability maps may be computed as described in FIG. 8 without displaying the output of the transformer to the user. For example the computed probability maps or other semantic data may be held temporarily in cache memory, stored at a data store or otherwise retained without displaying the information to the user.

Figure 10:
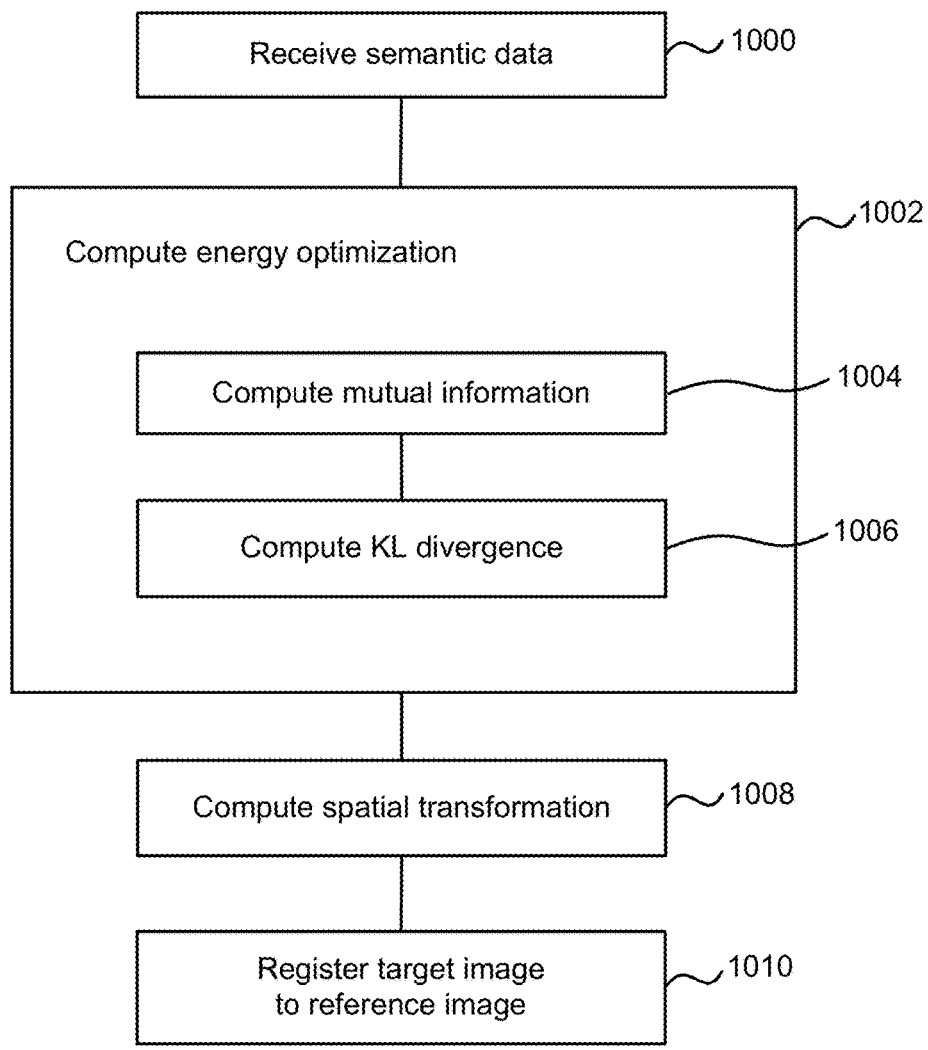
FIG. 10 is a flow diagram of an example method of image registration.

FIG. 10 is a flow diagram of an example method of image registration. Semantic data is received 1000 from the transformer 304 at the optimizer 308. In an embodiment the problem of how to register the reference image and the target image is an energy optimization problem. In an embodiment the energy optimization problem comprises finding a global point of inflection, for example the minimum or maximum of an energy function. For example the energy function 206 described above with reference to FIG. 2. An example method of computing the energy optimization 1002 is to formulate the energy optimization problem as an energy minimization task.

In order to compute the energy optimization function the mutual information may be computed 1004 between the reference image and the target image. The mutual information is a quantity that measures the mutual dependence of two variables, for example an image element in reference image I and an image element in target image J. In an example high mutual information indicates a large reduction in uncertainty; low mutual information indicates a small reduction; and zero mutual information between two random variables means the variables are independent In an example x is a random variable over coordinate locations in the reference image. In some embodiments samples are drawn from x in order to approximate the mutual information. In an example the mutual information may be defined as $$MI(I(x),J(T(x)))=h(I(x))+h(J(T(x)))-h(I(x),J(T(x)))$$

where $h(I(x))$ is the marginal entropy of the reference image and $h(J(T(x))$ is the marginal entropy of the part of the test image into which the reference image projects. $h(I(x), J(T(x)))$ is the joint entropy of the reference image and the target image. In an embodiment $h(\cdot)$ is the entropy of a random variable and is defined as $h(x) = -\int p(x,y) \ln p(x,y) dx dy$.

In some embodiments a Kullback-Leibler (KL) divergence may be computed 1006. The KL divergence is a non symmetric measure of the distance between two probability distributions. An example of computing the probability distributions is described above with reference to box 802 of FIG. 8 The KL divergence can be given by $$KL(I(x), J(T(x))) = \int_\Omega p(x) \sum_l P(p_i^l | x) \ln\left(\frac{P(B_i^l | x)}{P(B_i^l | T(x))}\right) dx$$

In an embodiment the energy optimization problem is an energy minimization task which may be computed from the mutual information and the KL divergence. For example the energy minimization problem may be:

$$T^* = \underset{T}{\operatorname{argmin}} E(T), E(T) = -MI(I(x), J(T(x))) + KL(I(x), J(T(x)))$$

where I is the target image, J is the moving image, T is the spatial transformation, MI is the mutual information, and KL is the Kullback-Leibler divergence and the point probability distribution p(x) is assumed uniform over the image domain Ω. In other examples the energy optimization problem may be an energy maximization task.

In other embodiments other methods may be used to compute an energy optimization. For example other entropy measures may be used. An example of an alternative entropy measure is the Shannon entropy.

Global optimization of the energy function E(T) enables a linear spatial transformation 1008 used to register the images to be computed and the target image to be registered 1010 to the reference image. In other embodiments a non-linear spatial transformation may be computed.

Figure 11:
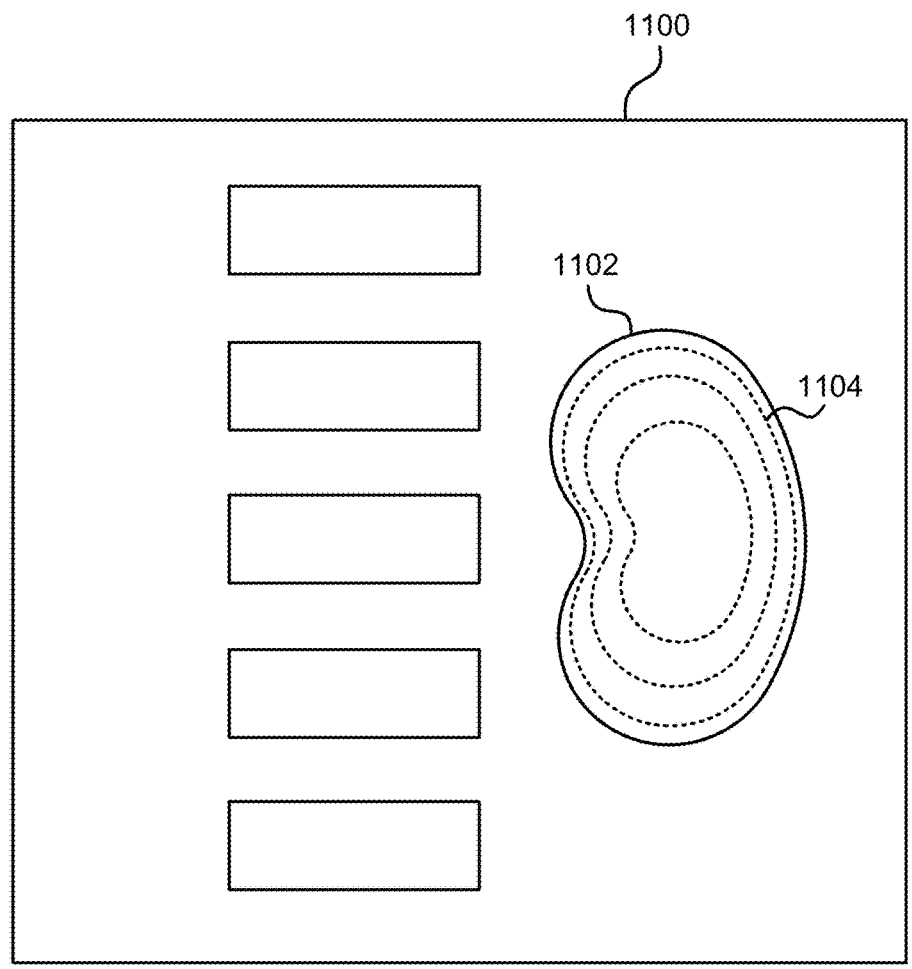
FIG. 11 is an example of a registered image.

FIG. 11 is an example of a registered image. The image 1100 may be a CT scan or other appropriate image. In this example the image shows the reference image of the right kidney 1102 with the registered target image of the right kidney overlaid as a contour map 1104. In an example the contours may be intensity contours, for example contours at 90, 70 and 60 percent of the intensity of the reference image. In other examples the registered target image may be overlaid as a partially transparent image or displayed sequentially.

Figure 12:
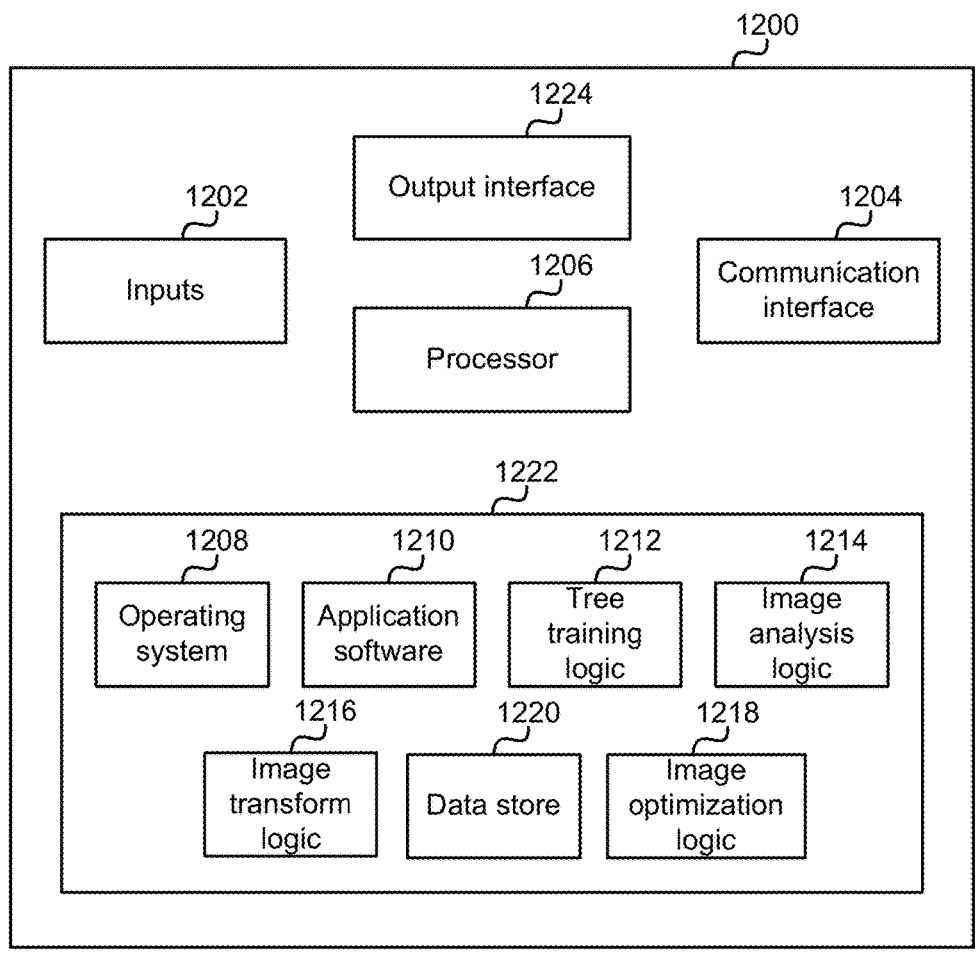
FIG. 12 illustrates an exemplary computing-based device in which embodiments of a medical image registration system may be implemented.

FIG. 12 illustrates various components of an exemplary computing-based device 1200 which may be implemented as any form of a computing and/or electronic device, and in which embodiments of an image registration system may be implemented.

The computing-based device 1200 comprises one or more inputs 1202 which are of any suitable type for receiving media content, Internet Protocol (IP) input, volumetric image data, input from medical devices, input from image capture devices, input from users, input from other computing-based devices. The device also comprises communication interface 1204 which may be used to enable the device to communicate with other devices over a communications network.

Computing-based device 1200 also comprises one or more processors 1206 which may be microprocessors, controllers or any other suitable type of processors for processing computing executable instructions to control the operation of the device in order to perform image registration. The processors 1206 may comprise one or more specialist image processing processors such as graphics processing units. In some examples, for example where a system on a chip architecture is used, the processors 1206 may include one or more fixed function blocks (also referred to as accelerators) which implement a part of a method of image registration in hardware (rather than software or firmware). Platform software comprising an operating system 1208 or any other suitable platform software may be provided at the computing-based device to enable application software 1210 to be executed on the device.

Further software that can be provided at the computing-based device 1200 includes tree training logic 1212 (which implements the techniques described for training a regression tree, or other appropriate tree training techniques), image analysis logic 1214 (which implements techniques of passing an unseen image through a regression tree as described herein), image transform logic 1216 (which computes semantic information as described herein) and image optimization logic 1218 (which solves the registration problem). A data store 1220 is provided to store data such as the training parameters, probability distributions, and analysis results.

The computer executable instructions may be provided using any computer-readable media that is accessible by computing based device 1200. Computer-readable media may include, for example, computer storage media such as memory 1222 and communications media. Computer storage media, such as memory 1222, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 1222) is shown within the computing-based device 1200 it will be appreciated that the storage may be distributed or located remotely and accessed via a network or other communication link (e.g. using communication interface 1204).

An output 1224 is also provided such as an audio and/or video output to a display system integral with or in communication with the computing-based device. The display system may provide a graphical user interface, or other user interface of any suitable type although this is not essential. In some examples the display system comprises a touch sensitive display screen.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of automatic image registration comprising:
receiving a first medical image and a second medical image, the first medical image and the second medical image being of objects and with at least part of one object being common to both the first medical image and the second medical image;
for each of the first medical image and the second medical image, computing a probability map comprising, for each image element, a probability that the image element is of a specified object, computing the probability map comprising using a regression forest comprising a plurality of regression trees each having been trained to produce probability map information;
finding a mapping to register the first medical image and the second medical image by optimizing an energy function which is a function of the intensities of the first medical image and second medical image and also of the probability maps, the energy function comprising: a summation of a term related to a Kullback-Leibler divergence; and a summation of a term related to a marginal entropy of the first medical image and a term related to a marginal entropy of the second medical image, less a term related to a joint entropy of the first medical image and the second medical image; and
at least one of:
displaying at least the first medical image as a contour map overlaid on top of at least the second medical image; or
displaying at least the first medical image or the second medical image such that the color or transparency of the at least first medical image or the second medical image is related to an estimated uncertainty of a registration value.

2. The method as claimed in claim 1., wherein the first medical image and the second medical image are of different modalities.

3. The method as claimed in claim 1, wherein the first medical image and the second medical image are of three or higher dimensions.

4. The method as claimed in claim 1, wherein computing the probability map comprises, for each image element, computing a plurality of probabilities such that there is one probability for each of a plurality of specified objects associated with the image element.

5. The method as claimed in claim 1, wherein computing the probability map comprises clustering image elements together based on their appearance, spatial context and their confidence in predictions of bounding boxes of at least one specified object.

6. The method as claimed in claim 1, wherein computing the probability map comprises using a classification forest comprising a plurality of classification trees having been trained to classify image elements into specified categories.

7. The method as claimed in claim 1, wherein finding the mapping comprises globally optimizing the energy function.

8. The method as claimed in claim 1, wherein computing the probability map comprises forming an aggregate probability map for all objects in the first medical image and the second medical image.

9. An automatic image registration system comprising:
an input arranged to receive a first image and a second image, the first and second images being of objects and with at least part of one object being common to the first and second images;
a processor arranged to compute semantic information for each of the first and second images, the semantic information comprising information about types of the objects in the first and second images and a certainty of the semantic information, computing the semantic information comprising using a regression forest comprising a plurality of regression trees each having been trained to produce semantic information;
the processor further arranged to find a mapping to register the first and second images, the mapping taking into account intensities of image elements of the first and second images and also taking into account the semantic information in a manner which is weighted by the certainty of the semantic information; and
the processor further arranged to register the first and second images based at least in part on minimizing an energy function, the energy function comprising:
a summation of a term related to a Kullback-Leibler divergence and a summation of a term related to a marginal entropy of the first image and a term related to a marginal entropy of the second image, less a term related to a joint entropy of the first and second images.

10. The system as claimed in claim 9, wherein computing the semantic information is achieved by any of: classifier, support vector machine, regression forest, decision forest, relevance vector machine.

11. The system as claimed in claim 10, wherein adaptive boosting is used in combination with any of: classifier, support vector machine, regression forest, decision forest, relevance vector machine.

12. The system as claimed in claim 10, wherein the processor is arranged to transform the semantic information to form a probability map for each of the first and second images.

13. The system as claimed in claim 12, wherein transforming the semantic information to form the probability maps comprises forming one probability map for each object in the first and second images.

14. The system as claimed in claim 12, wherein transforming the semantic information to form the probability maps comprises forming an aggregate probability map for all objects in the first and second images.

15. The system as claimed in claim 9, the processor being further arranged to display, on a display device, the second image as an overlay on top of the first image such that a user can toggle between viewing the first image with the second image overlay and without it.

16. The system as claimed in claim 9, the processor being further arranged to display, on a display device, at least the first image as a contour map overlaid on top of at least the second image, and to display, on the display device, at least the first image or the second image such that the color or transparency of the at least first image or the second image is related to an estimated uncertainty of a registration value.

17. A method of automatic medical image registration comprising:
receiving a first medical image and a second medical image, the first medical image and the second medical image being of objects and with at least part of one object being common to the first medical image and the second medical image;
for each of the first and second medical images, computing a probability map comprising, for each image element, a probability that the image element is of a specified object;
wherein computing the probability map comprises, for at least one specified object, computing a posterior distribution of the location of the specified object in each of the first and second medical images by using a regression forest comprising a plurality of regression trees each having been trained to predict a location of the specified object;

finding a mapping to register the first and second medical images by optimizing an energy function which is a function of the intensities of the first and second medical images and also of the probability maps, the energy function comprising: a summation of a term related to a Kullback-Leibler divergence; and a summation of a term related to a marginal entropy of the first medical image and a term related to a marginal entropy of the second medical image, less a term related to a joint entropy of the first and second medical images.

18. The method as claimed in claim 17, wherein the first and second medical images are three or higher dimensional volumetric images.

19. The method as claimed in claim 17, wherein the first medical image and the second medical image are of different modalities.

20. The method as claimed in claim 17, wherein the posterior distribution is computed using a subset of leaf nodes wherein the subset of leaf nodes comprises a most confident leaf nodes within the regression forest.

* * * * *